(12) United States Patent
Holmes et al.

(10) Patent No.: US 11,803,292 B2
(45) Date of Patent: Oct. 31, 2023

(54) USER INTERFACE COMPONENT AND REGION LAYOUT CONTROL

(71) Applicant: Microsoft Technology Licensing, LLC, Redmond, WA (US)

(72) Inventors: James Iain Jonathan Holmes, Belfast (GB); Hylke Bons, Groningen (NL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/685,499

(22) Filed: Mar. 3, 2022

(65) Prior Publication Data
US 2023/0280882 A1  Sep. 7, 2023

(51) Int. Cl.
*G06F 3/0483* (2013.01)
*G06F 3/16* (2006.01)

(52) U.S. Cl.
CPC ............ *G06F 3/0483* (2013.01); *G06F 3/167* (2013.01)

(58) Field of Classification Search
None
See application file for complete search history.

(56) References Cited

U.S. PATENT DOCUMENTS

| | | | | |
|---|---|---|---|---|
| 5,714,971 A * | 2/1998 | Shalit | ................... | G06F 3/0481 715/792 |
| 6,166,736 A * | 12/2000 | Hugh | .................... | G06F 3/0481 715/777 |
| 6,707,476 B1 * | 3/2004 | Hochstedler | ............ | G06F 9/451 715/744 |
| 7,124,360 B1 | 10/2006 | Drenttel et al. | | |
| 9,921,714 B1 | 3/2018 | Shapiro et al. | | |
| 10,860,175 B2 | 12/2020 | Gupta et al. | | |
| 2002/0194226 A1 * | 12/2002 | Sheth | ................... | G06F 16/954 715/275 |

(Continued)

FOREIGN PATENT DOCUMENTS

| | | |
|---|---|---|
| CN | 106935180 A | 7/2017 |
| CN | 103970417 B | 12/2017 |

OTHER PUBLICATIONS

Habibian, Mana, "Introducing Smart Templates for Easier Editing—a UX Case Study", retrieved from «https://uxdesign.cc/introducing-smart-templates-a-ux-case-study-on-making-editing-faster-cb06054e321c»», Sep. 20, 2019, 12 pages.

(Continued)

*Primary Examiner* — Mandrita Brahmachari
(74) *Attorney, Agent, or Firm* — Ogilvie Law Firm

(57) ABSTRACT

An embodiment facilitates user control of user interface layouts. A layout diagram visually and diagrammatically represents a current layout. The layout diagram includes layout diagram regions which correspond to user interface component regions in the current layout; the user interface component regions have user interface components as occupants. The embodiment gets a choice identifying a traveler component and a destination region, with the traveler component being an occupant of a source region. The embodiment modifies the current layout of the user interface to produce a modified layout in response to the choice, and updates the layout diagram to match the modified layout. Interaction is improved by diagrammatically showing the user the results of possible layout changes before performing any of them.

20 Claims, 6 Drawing Sheets

(56) References Cited

U.S. PATENT DOCUMENTS

| | | | | |
|---|---|---|---|---|
| 2007/0118598 A1* | 5/2007 | Bedi | ............... | G06Q 10/107 |
| | | | | 709/204 |
| 2009/0177477 A1* | 7/2009 | Nenov | ............... | G16H 10/60 |
| | | | | 704/E15.04 |
| 2015/0074728 A1* | 3/2015 | Chai | ............... | H04L 67/12 |
| | | | | 725/61 |
| 2016/0103793 A1* | 4/2016 | Fang | ............... | G06F 3/0483 |
| | | | | 715/234 |
| 2018/0300020 A1* | 10/2018 | Dyar | ............... | G06F 9/451 |
| 2019/0258396 A1 | 8/2019 | Barrick | | |

OTHER PUBLICATIONS

"Accessibility", retrieved from <<https://en.wikipedia.org/wiki/Accessibility>>, Jan. 28, 2022, 22 pages.

"Switches—Adaptive", retrieved from <<https://enablingdevices.com/product-category/switches/>>, no later than Feb. 3, 2022, 6 pages.

"Support snap layouts for desktop apps on Windows 11", retrieved from <<https://docs.microsoft.com/en-US/windows/apps/desktop/modernize/apply-snap-layout-menu>>, Nov. 4, 2021.

\* cited by examiner

USER INTERFACE COMPONENT AND REGION LAYOUT CONTROL

BACKGROUND

User interfaces for software have grown more varied and complex over time. Some early user interfaces were limited to command line interpreters, which had no graphical aspect other than displaying, on a monitor, characters like the ones shown on keyboard keys. More recent user interfaces include graphical user interfaces that display various combinations of windows, icons, menus, buttons, dialog boxes, sliders, scroll bars, animations, videos, and other graphical elements. The display area available to a graphical user interface has also increased over time. Larger individual display screens have become available as screen display technologies evolved, e.g., from cathode-ray tubes to liquid-crystal devices. Also, multiple physical screens can now be placed next to one another and configured to operate as a single logical display area. As a result of the larger display areas, the number of individual user interface components that can be displayed together has also increased.

However, advances are still possible in the technology for presenting information in a software program user interface.

SUMMARY

Some embodiments described herein facilitate user control of a program user interface layout. A user interface layout diagram visually and diagrammatically represents a current layout of user interface components within a window. The layout diagram includes layout diagram regions which correspond to user interface component regions in the current layout. The user interface component regions have user interface components as occupants. These embodiments computationally get a choice, via the layout diagram, which identifies a traveler component and a destination region. The traveler component is an occupant of a source region. These embodiments computationally modify the current layout of the user interface to produce a modified layout in response to the choice, and update the layout diagram to match the modified layout. Thus, embodiments may promote efficient and effective layout changes within a user interface window by visually and diagrammatically showing the user what the modified layout would look like without first requiring actual modification of the layout. This can reduce user burdens, allowing faster layout changes with fewer wrong turns and less user frustration.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
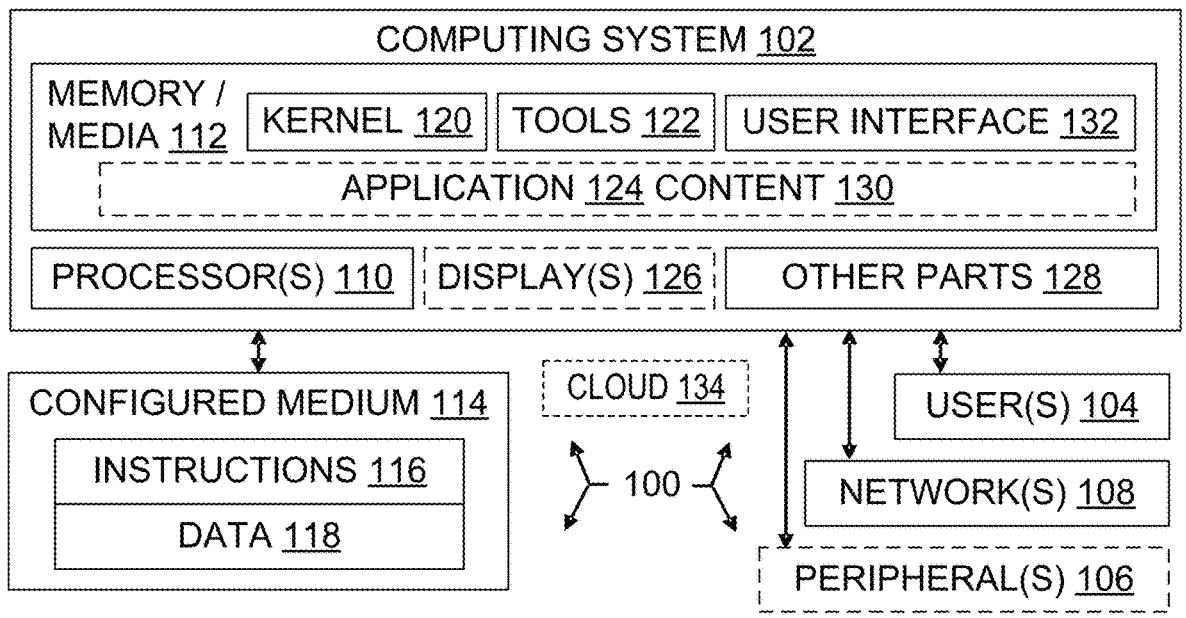
FIG. 1 is a block diagram illustrating computer systems and also illustrating configured storage media.

Innovations may expand beyond their origins, but understanding an innovation's origins can help one more fully appreciate the innovation. In the present case, some teachings described herein were motivated by technical challenges arising from goals such as making Microsoft Visual Studio® software, kernel 120 software, and other tools 122 more accessible to users, e.g., users who have difficulty operating a mouse (mark of Microsoft Corporation). Some users 104 face the challenge of interacting with software without operating a mouse or a keyboard, e.g., by using a switch device which provides a few (less than ten) switches; some provide only a single switch as an input mechanism 106.

Microsoft innovators noted that some applications 124 have complex and dynamic layouts, with panels and other tool windows that can be rearranged into various positions by a user. The innovators concluded that a familiar drag-and-drop approach to changing GUI layout is often awkward, even when a user is physically capable of operating a multi-button mouse.

Some embodiments described herein computationally analyze a current layout, and determine where tool windows could be placed, and then generate pictorial diagrammatic representations of the layout. Offering these prospective layouts by way of diagrams allows a user to rearrange a panel layout by selecting a desired layout modification position. Selection may be accomplished using a mouse, a keyboard, or assistive technology. Some embodiments highlight the destination 204 in the underlying actual UI as the user selects the different regions 308 in the pictorial representation 306. This provides an enhanced system that is faster, less prone to mistakes, easier to use, and more accessible than other approaches.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 134. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. Virtual reality or augmented reality or both functionalities may be provided by a system 102. A screen 126 may be a removable peripheral 106 or may be an integral part of the system 102. Multiple physical screens may be configured to operate together as a single larger logical (a.k.a. virtual) screen 126. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, graphic designers, copywriters, creative directors, production assistants, developers, testers, engineers, auditors, and end-users are each a particular type of human user 104. Automated agents, scripts, playback software, devices, and the like running or otherwise serving on behalf of one or more humans may also have accounts, e.g., service accounts. Sometimes an account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a cloud 134 and/or other network 108 via network interface equipment, for example.

Each computer system 102 includes at least one processor 110. The computer system 102, like other suitable systems, also includes one or more computer-readable storage media 112, also referred to as computer-readable storage devices 112. Applications 124, application content 130, and user interface software 132 may reside in media 112 within a system 102. Application software 124 may include apps on mobile devices 102 or workstations 102 or servers 102, as well as APIs, browsers, web storefronts, and other webpages and the corresponding software for protocols such as HTTPS.

Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs, GPUs, and/or quantum processors), memory/storage media 112, peripherals 106, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, enhanced accessibility devices 1100, etc.) will be present in operable communication with one or more processors 110 and memory 112.

In some embodiments, an enhanced system 102 may be networked through an interface 128. An interface 128 may include hardware such as network interface cards, software such as network stacks, APIs, or sockets, combination items such as network connections, or a combination thereof.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, user interface control functionality 132 could be installed on an air gapped network and then be updated periodically or on occasion using removable media 114. A given embodiment may also communicate technical data and/or technical instructions through direct memory access, removable or non-removable volatile or nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More about Systems, Operational Examples

FIGS. 2 through 8 illustrates aspects of improved human-computer interaction via a user interface in a computing system 102 which is configured by one or more of the user interface control enhancements taught herein. This enhanced system 102 may include a single machine, a local network of machines, machines in a particular building, machines used by a particular entity, machines in a particular datacenter, machines in a particular cloud, or another computing environment 100 that is suitably enhanced. Illustrated items are discussed at various points herein, and additional details regarding them are provided in the discussion of a List of Reference Numerals later in this disclosure document.

FIGS. 2 through 8 show aspects of a stylized user interface 132 of a device 102. This is not a comprehensive summary of all user interface aspects which may be useful in user interface control. A window 202 includes several user interface component regions 204, and a title bar 212 containing various controls 210 and a title 214. The text of the title 214, and some other text such as displayed application content 130, are represented in the Figures by line segments 208, both for generality and for clarity of illustration. However, other text such as the names 216 of tab 218 occupants 220 and the names 206 of region 204 occupants 220 is shown, to aid clarity in the discussion of innovative user control functionality.

Figure 2:
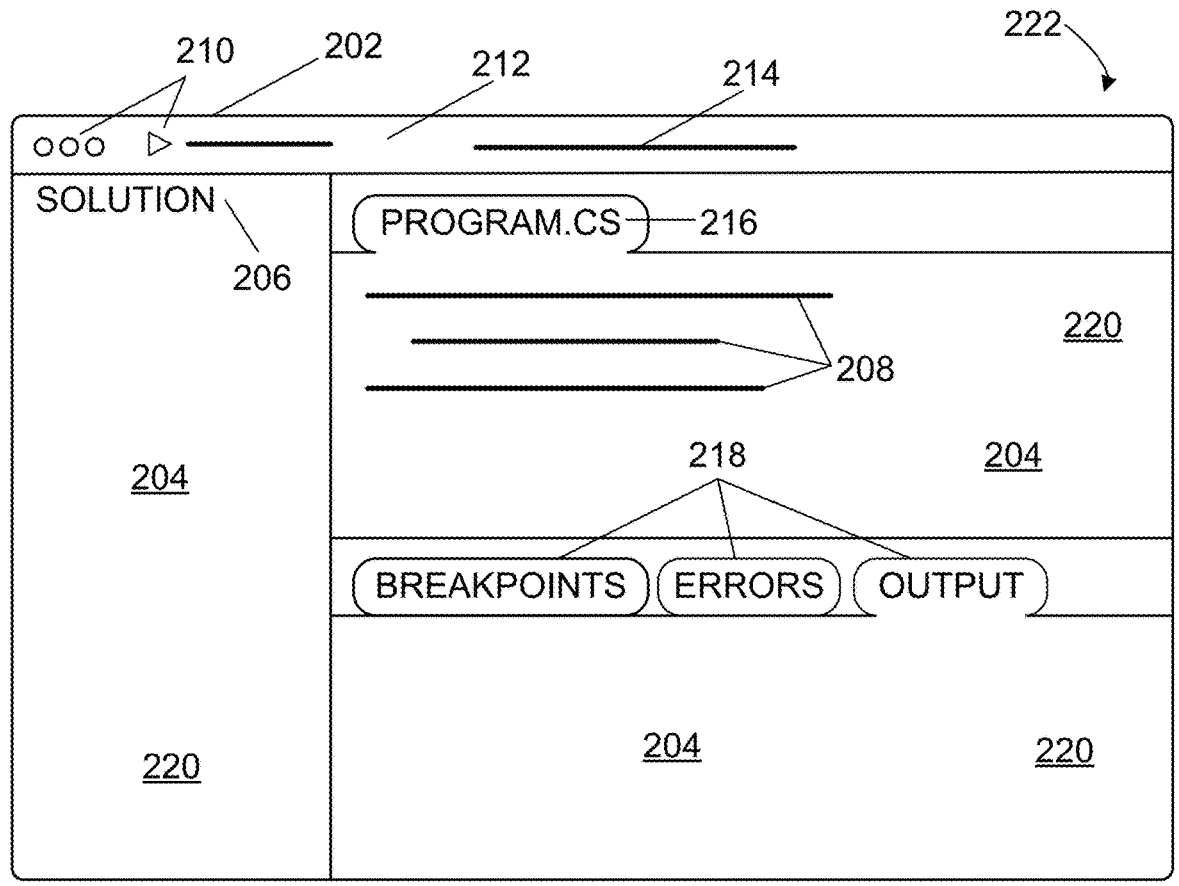
FIG. 2 is a stylized user interface diagram illustrating aspects of a user interface window, including component regions, tabbed components, and application content.

In FIG. 2, for instance, three user interface component regions 204 are shown. On the left is a non-tabbed region 204 containing a component 220 named SOLUTION. On the upper right is a tabbed region 204 having exactly one tab 218, which contains a component 220 named PROGRAM.CS. On the lower right is a tabbed region 204 having exactly three tabs 218, which respectively contain components 220 named BREAKPOINTS, ERRORS, and OUTPUT.

Figure 3:
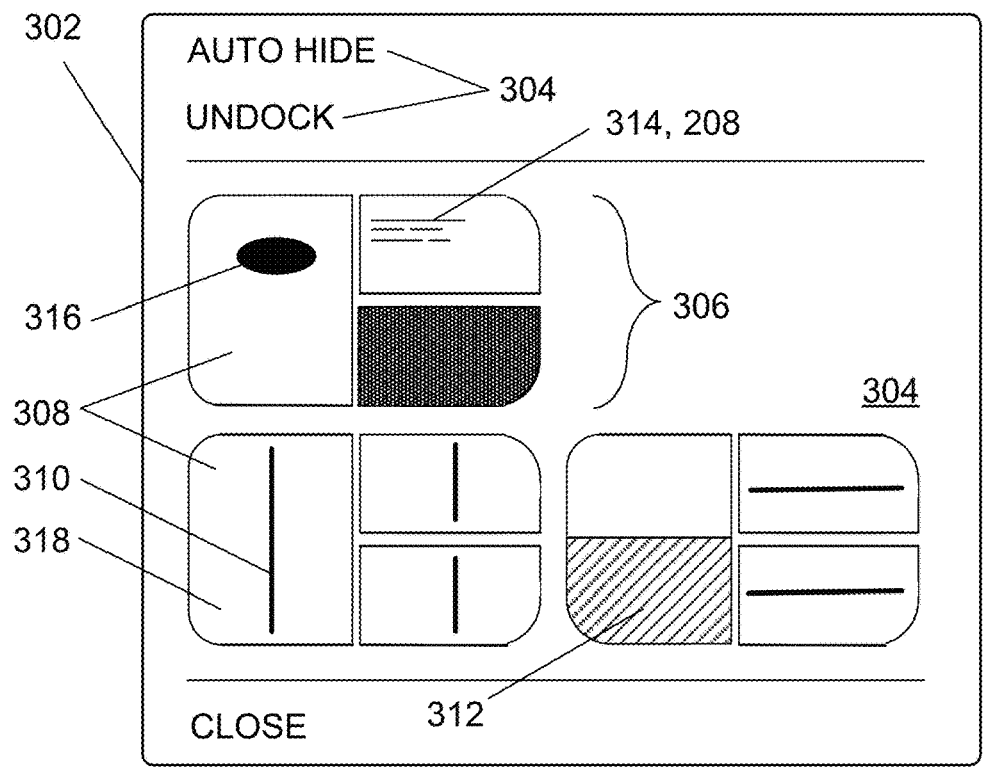
FIG. 3 is a stylized user interface diagram illustrating aspects of a user interface menu, including layout control diagrams.

FIG. 3 shows a menu 302 which includes four menu items 304. The menu may be implemented, e.g., as a drop-down menu or a pop-up menu. In this example, the first two menu items and the fourth menu item are each represented by text (AUTO HIDE, UNDOCK, CLOSE). The third menu item 304 includes layout diagrams 306. Text could also be included with a layout diagram, but in the illustrated example the layout diagram is free of text. Three layout diagrams 306 are shown in the FIG. 3 example, but a given menu 302 implementation may include one or more layout diagrams 306. In some embodiments, one of the layout diagrams 306 represents the current layout and the other(s) represent at least some of the possible modified layouts, whereas in other embodiments all of the layout diagram(s) presented to the user represent possible modified layouts.

Which modified layouts are possible may be determined computationally, e.g., by including each existing non-selected region as a possible target for a currently selected source component. In some embodiments, divisions (splits 1016) of each existing region 204 are also included as possible destinations.

Each of the FIG. 3 layout diagrams 306 includes three layout diagram regions 308, which generally match the three user interface component regions 204 shown in FIG. 2, in count, in relative position, and in relative size. In general, layout diagram regions 308 displayed to represent user interface component regions 204 will match exactly in terms of region count (with an exception discussed in connection with FIG. 8), and will also match unambiguously in terms of the positions of regions relative to each other (again, with an exception discussed in connection with FIG. 8). A match between relative sizes of layout diagram regions 308 and relative sizes of user interface component regions 204 may have a tolerance, e.g., the relative sizes may be within 5%, 10%, 15%, 20%, or 25% in respective implementations, or no particular tolerance may be enforced in a given implementation.

In some layout diagrams 306, a selected or otherwise targeted source user interface component region 204 or destination user interface component region 204 or both is visually indicated by shading, a color difference, or another form of visual highlighting in the corresponding layout diagram region 308. For instance, FIG. 3 shows two highlighted regions 308, including a lower right region 308 corresponding to the FIG. 2 tabbed region 204 that contains BREAKPOINTS, ERRORS, and OUTPUT components, as well as a new region 312 indicating a prospective new region 204 that would be located in a lower part of the region 204 currently occupied by the SOLUTION component 220. These highlights in FIG. 3 are shown to illustrate the region highlighting option, and do not necessarily form part of any particular example of embodiment operation.

In some layout diagrams 306, an icon 316 is shown on a given region 308 to visually indicate that the corresponding region 204 holds a component 220 whose functionality or content 130 is of a particular category, e.g., build output, compiler output, debugger watch window, built application I/O, source code, portable document format (PDF), spreadsheet, text processor, presentation slide deck, and so on. Text in general, or text of a particular kind such as source code 314, may also or alternately be indicated in a region 308 as line segments 208.

In some layout diagrams 306, a region 308 includes a line segment 310 (solid, dashed, colored, or otherwise) or another visual division indicator 310, such as a color difference. The division indicator 310 in a region 308 indicates that a region 204 will be divided, e.g., a new region 204 or in some embodiments a new tab 218, will be created if a component 220 is moved into the current region 204 corresponding to the region 308 that contains the division indicator 310. In some embodiments, a division indicator 310 only indicates the prospective creation of a new region 204, not a new tab 218, because the creation of a new tab is a default operation when a component 220 is being moved to a region 204 that already contains at least one other component 220.

Figure 4:
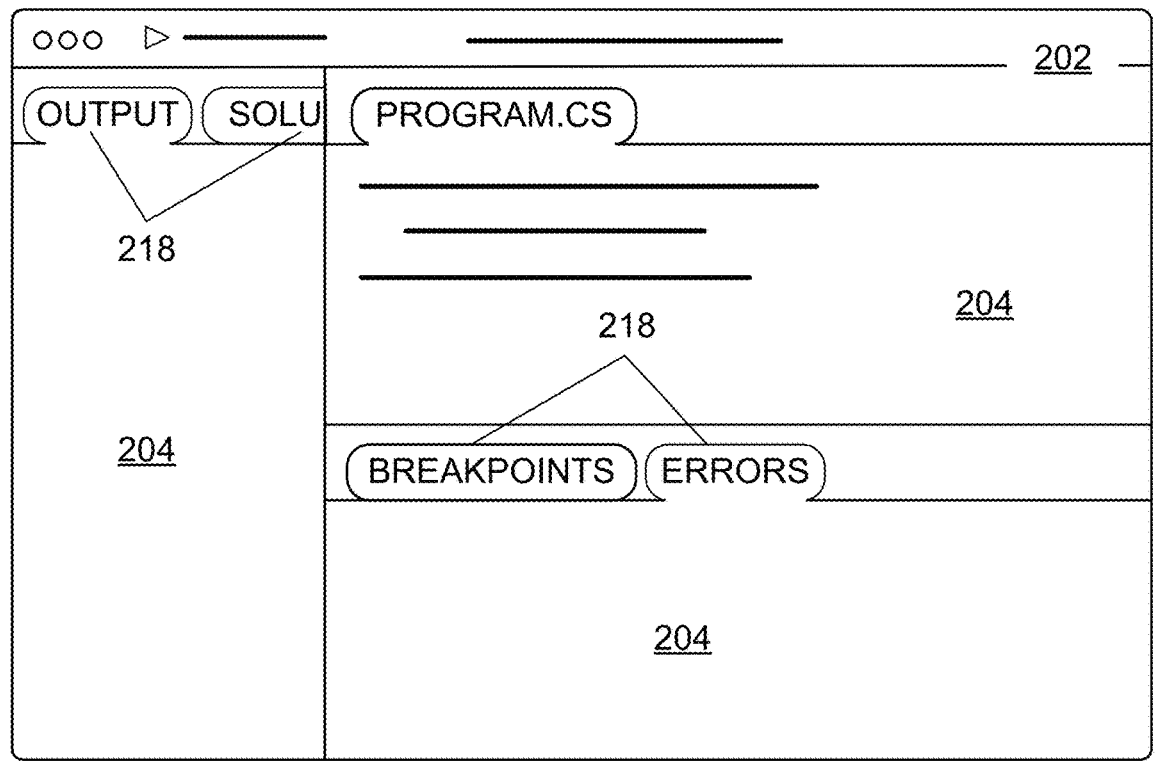
FIG. 4 is a stylized user interface diagram illustrating the FIG. 2 window after a layout change in which an OUTPUT tabbed component is moved from one region to a previously non-tabbed SOLUTION region, and the previously non-tabbed SOLUTION region content is placed in a SOLUTION tab.

FIG. 4 shows the FIG. 2 window 202 after a layout change in which the OUTPUT tabbed component 220 has been moved from the lower right region 204 to the previously non-tabbed SOLUTION region 204. The previously non-tabbed SOLUTION region component and its content 130 have been placed in a new SOLUTION tab 218 and removed from the lower right region 204. In the particular example shown, the moved component (a.k.a. traveler component) OUTPUT 220 is positioned as the top tab at the new location, with the existing SOLUTION component behind it. An alternate implementation of the innovative user interface 132 places the relocated traveler component 220 behind all of the component(s) that were already located at the target destination region 204.

Figure 5:
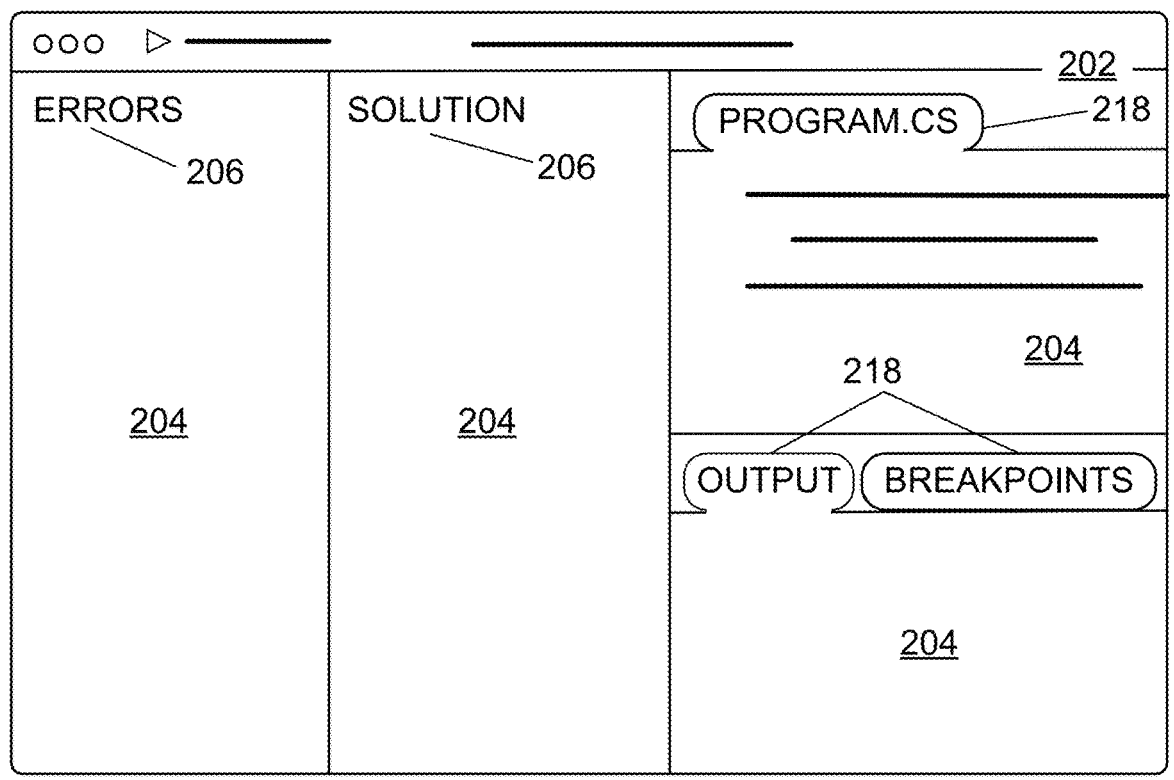
FIG. 5 is a stylized user interface diagram illustrating the FIG. 2 window after a layout change in which an ERRORS tabbed component is moved from one region into a newly created non-tabbed ERRORS region.
Figure 6:
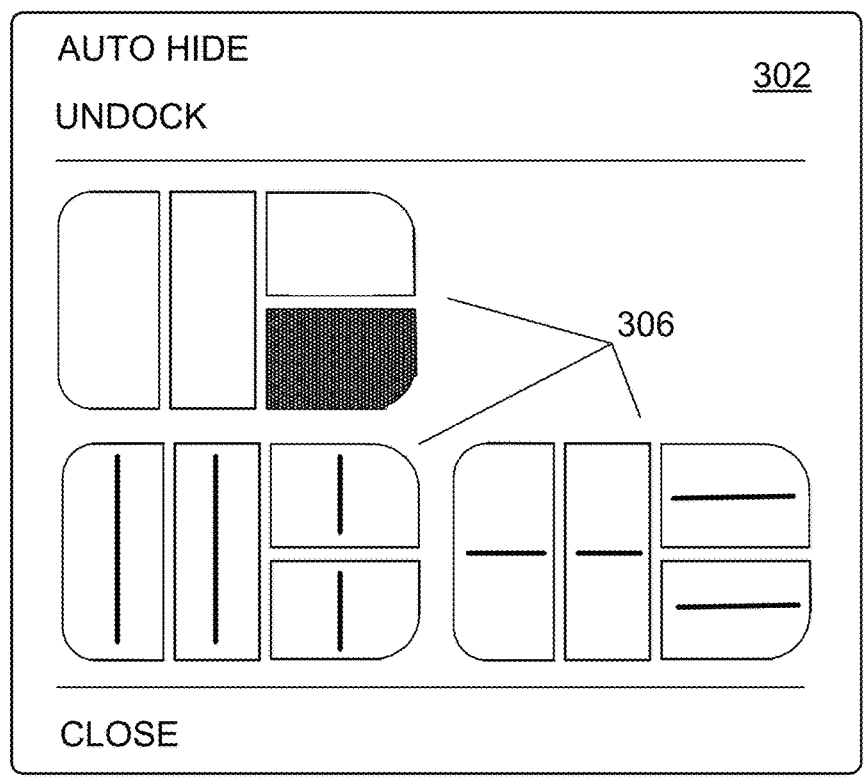
FIG. 6 is a stylized user interface diagram illustrating an update to the FIG. 3 layout control diagrams after the FIG. 5 layout change.

FIG. 5 shows the FIG. 2 window after a layout change in which the ERRORS tabbed component 220 has been moved from the lower right region 204 into a newly created non-tabbed ERRORS region 204. This destination may have been selected, e.g., using the FIG. 3 menu by selecting a left portion 318 of the layout diagram region 308. The layout diagrams 306 are updated to match the changed layout of the regions 204, as shown in FIG. 6.

In the particular example depicted in FIG. 5, the two righthand regions 204 are reduced in size to make space for the new ERRORS region. In some alternate implementations or configurations, all three pre-change regions 204 may be resized to make room for a new region 204. In some alternate implementations or configurations, the window 202 may be resized to make room for a new region 204. In some, a combination of resizing operations is performed.

Figure 7:
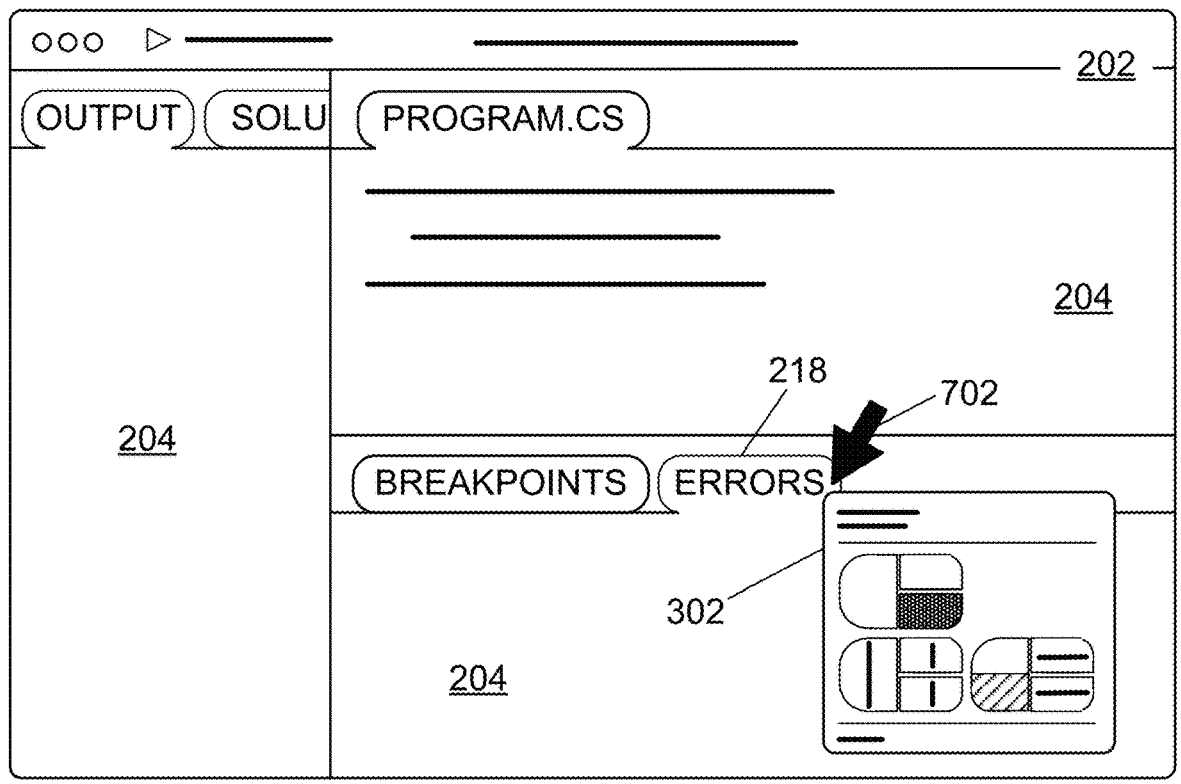
FIG. 7 is a stylized user interface diagram illustrating the FIG. 4 window with a layout change menu activated in response to a cursor position.

In some embodiments, the choice of source component 220 is implicit in the cursor 702 position. For instance, FIG. 7 shows the FIG. 4 window 202 with a layout change menu 302 activated in response to a cursor 702 position that not only displays the menu 302 but also selects the ERRORS component 220 as the source component. After the menu is displayed, the cursor may be moved into the menu's layout diagram to select the destination region 204 that will receive the ERRORS component 220 after the layout change is authorized via user interaction with the menu. The change may be authorized, e.g., by a mouse button click, return or space key press, or other peripheral input. The menu 302 may be removed from display if no layout change is desired, e.g., by moving the cursor to a position that is off the menu and also off the tab, or by pressing an Escape key, or by a timeout during which no destination 204 is selected.

Figure 8:
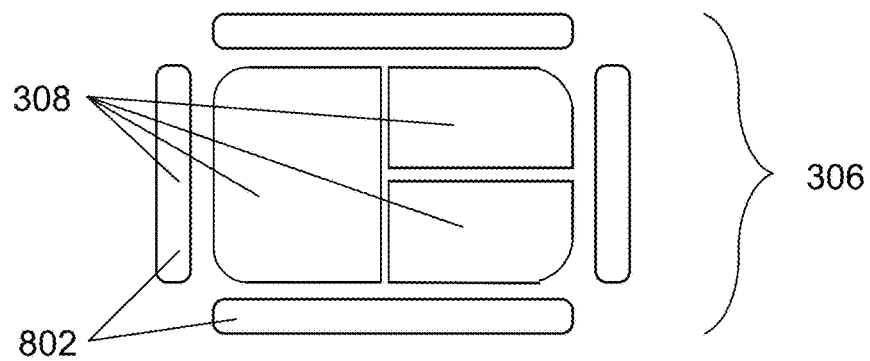
FIG. 8 is a stylized user interface diagram illustrating an alternate layout control diagram, which shows potential new regions positioned on a periphery of current regions.
Figure 11:
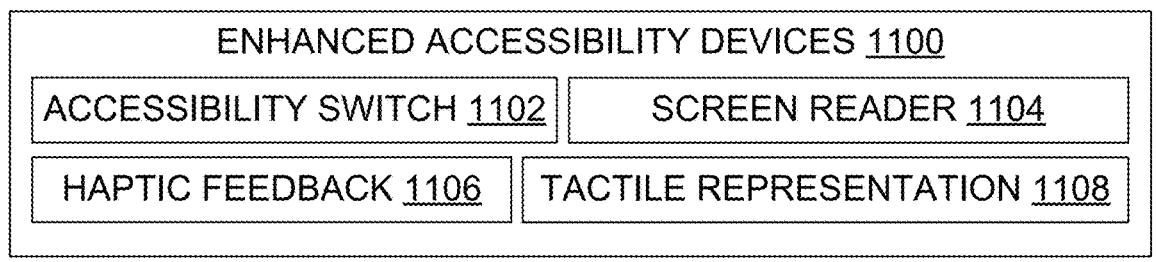
FIG. 11 is a block diagram illustrating some enhanced accessibility devices.

FIG. 8 shows an alternate layout control diagram 306, which shows potential new regions 802, 204 that are positioned on a periphery 1022 of the current regions 308. For convenience, these are designated here the top, right, bottom, and left regions 802. Selecting the left peripheral region 802 from the FIG. 8 layout diagram in the context of the three regions 204 shown in FIG. 2, for example, indicates that the destination is a new region 204 to be created and be positioned to the left of the existing three regions 204, i.e., to the left of the SOLUTION region 204. If the ERRORS component was the selected traveler, then the layout change would result in a layout along the lines of FIG. 5.

In some embodiments, an enhanced system 102 includes a computing system 102 which is configured to control a user interface 132. The enhanced system 102 includes a digital memory 112, a display device 126 configured with the user interface, and a processor 110 in operable communication with the memory. The digital memory 112 may be volatile or nonvolatile or a mix. The processor 110 is configured to perform user interface control steps. The steps include (a) displaying 902 in the user interface a layout diagram 306 which visually and diagrammatically represents a current layout 222, the layout diagram including layout diagram regions 308 which correspond to user interface component regions 204 in the current layout, the user interface component regions having user interface components 220 as occupants, (b) getting 904 a choice which identifies a traveler component 220 and a destination region 204, the traveler component being an occupant of a source region 204, (c) modifying 906 the current layout 222 to produce a modified layout 222 in response to the choice, and (d) updating 908 the layout diagram to match the modified layout. Familiar layout creation or modification library elements, e.g., API routines and window data structures, can be adapted for use according to these teachings, e.g., by specifying which component to move, where to move it, and whether to add or remove tabs or regions.

In some embodiments, the system 102 further includes an enhanced accessibility device 1100, and the getting 904 is performed using at least the enhanced accessibility device, and the enhanced accessibility device includes at least one of the following: an accessibility switch device 1102; a screen reader 1104 which vocalizes layout information; a haptic feedback device 1106; or a tactile representation device 1108 which provides a tactile representation of layout information.

In some embodiments, the current layout 222 includes at least one region 204 having at least two user interface components 220 as occupants, each user interface component having a respective tab 218 in the region and also having respective displayable contents 130, and the system is configured to display or hide the displayable content according to which tab is selected, and modifying the current layout includes at least one of the following: moving 1018 the traveler component from a tab in the source region to a tab in the destination region, the tab in the destination region created 1004 in response to the choice; or moving 1018 the traveler component from a tab in the source region to the destination region after creating 1006 the destination region in response to the choice. Familiar tab or region creation library elements, e.g., API routines and window data structures, can be adapted for use according to these teachings, e.g., by specifying which component to move, where to move it, and whether to add or remove tabs or regions.

In some embodiments, the layout diagram 306 represents a displayable content 130 of a user interface component 220 using at least one of the following: a set of line segments 208 as a stylized representation of text content; or an icon 316 as a stylized representation of a particular category of content.

In some embodiments, the layout diagram regions 306 have respective layout diagram region sizes, the user interface component regions 204 have respective user interface component region sizes, and a ratio of sizes of any two layout diagram regions LR1 and LR2 is within an inclusive range from 0.9 times AR to 1.1 times AR, where AR is a ratio of actual region sizes of AR1 and AR2, where AR1 and AR2 are user interface component regions represented in the layout diagram by LR1 and LR2. That is, the layout diagram relative sizes match 1012 the actual region 204 relative sizes within a 10% tolerance. In variations, the match 1012 is within other tolerances, e.g., 5%, 15%, 20%, or 25%.

In some embodiments, the layout diagram 306 visually and diagrammatically represents 1014 an option of splitting 1016 a region 204 into at least two regions 204. This may be implemented, e.g., using a division indicator 310, with associated layout change functionality to create a new region 204. As used herein, representing an item "visually" means making the item visually perceptible, and representing an item "diagrammatically" means using a visual diagram as opposed to relying on a textual display.

In some embodiments, the layout diagram 306 visually and diagrammatically represents 1020 an option of creating 1006 a new region 204 in a location on a periphery 1022 of the current layout diagram regions. FIG. 8 shows four periphery locations (top, right, bottom, left), but other embodiments may include a proper subset of these locations, or may show multiple prospective destinations above, below, to the right of, or to the left of, existing regions 204, or any combination thereof.

Other system embodiments are also described herein, either directly or derivable as system versions of described processes or configured media, duly informed by the extensive discussion herein of computing hardware.

Although specific user interface control architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different display layouts, for example, as well as other technical features, aspects, mechanisms, criteria, operational sequences, data structures, environment or system characteristics, or other user interface control functionality teachings noted herein, and may otherwise depart from the particular illustrative examples provided.

Processes (a.k.a. Methods)

Figure 9:
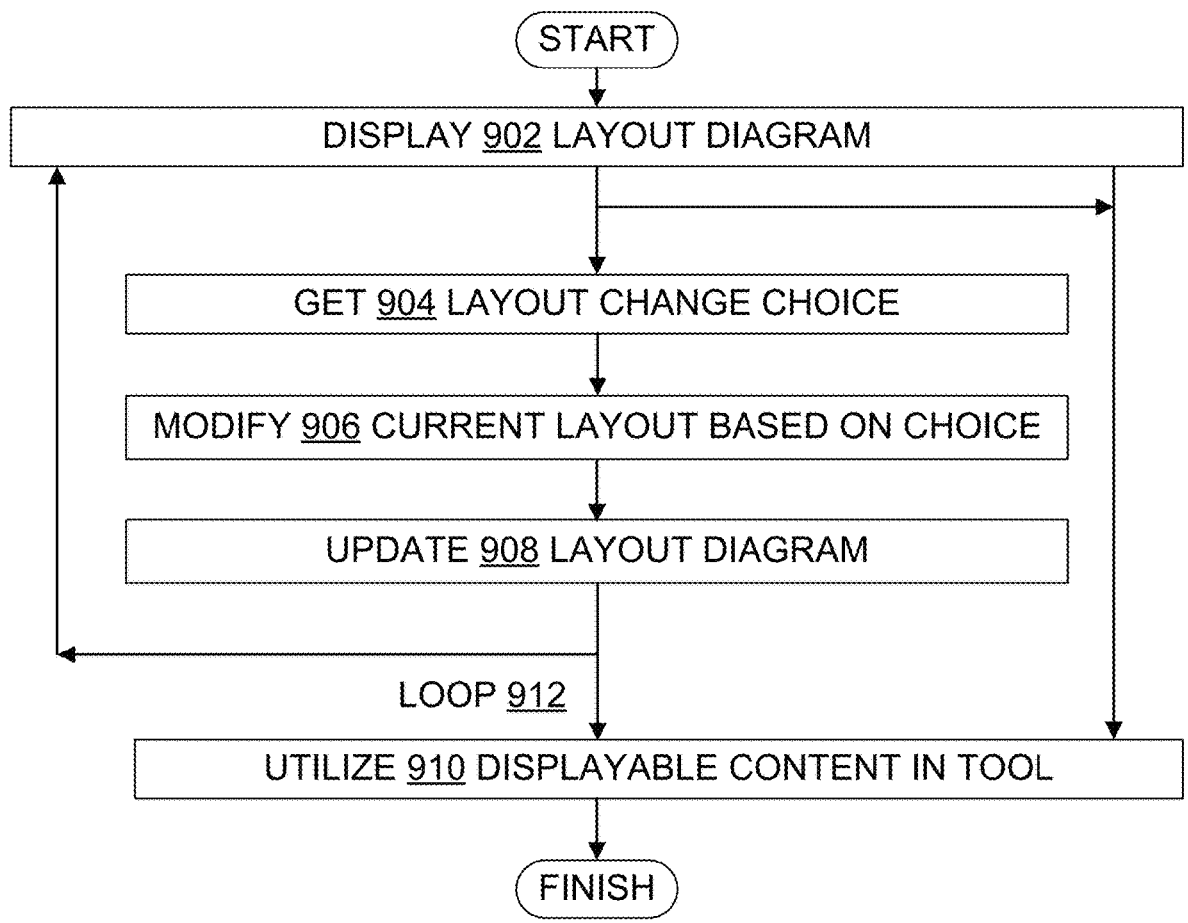
FIG. 9 is a flowchart illustrating steps in some user interface component and region layout control methods.
Figure 10:
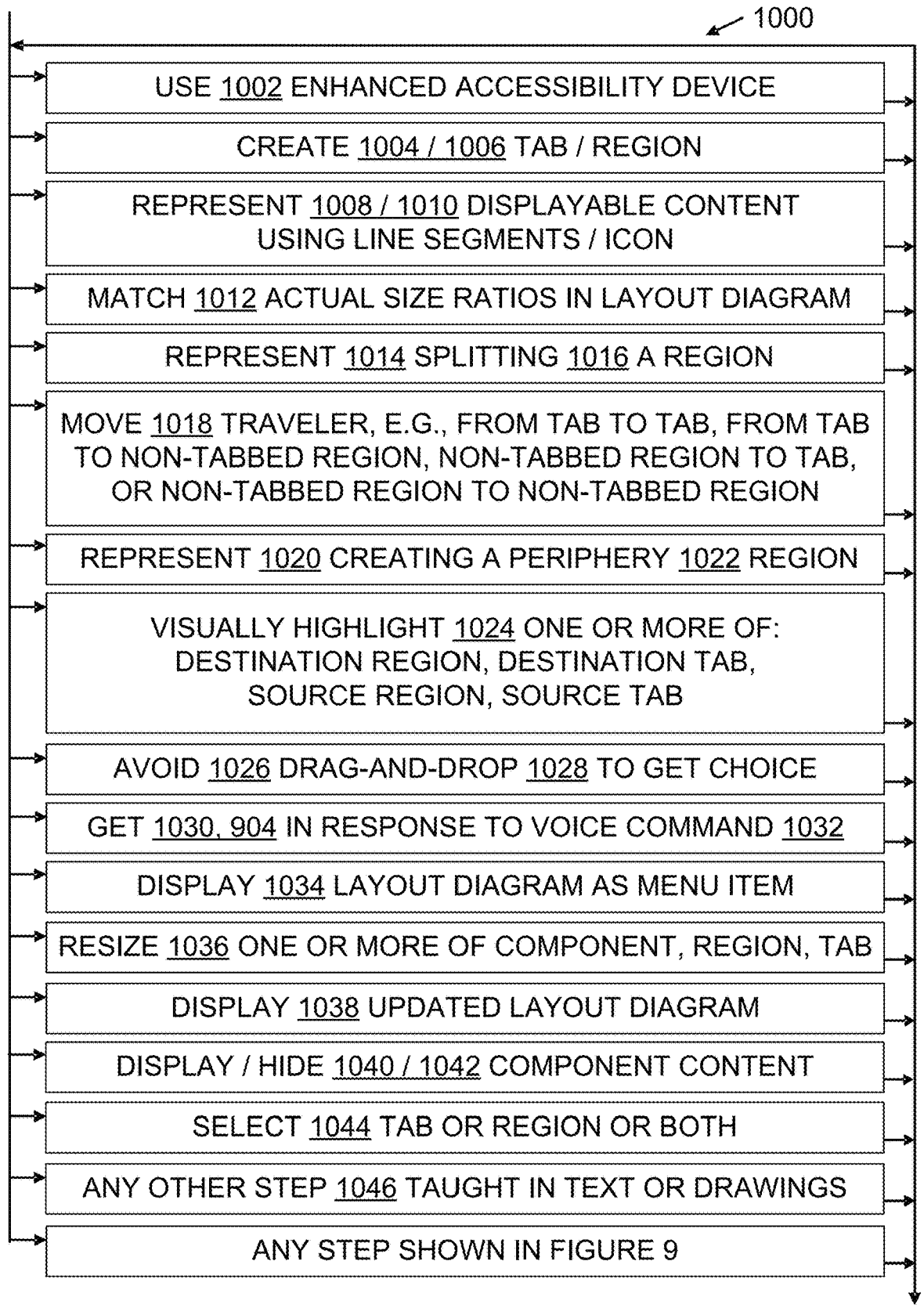
FIG. 10 is a flowchart further illustrating steps in some user interface component and region layout control methods, incorporating FIG. 9.

Methods (which may also be referred to as "processes" in the legal sense of that word) are illustrated in various ways herein, both in text and in drawing figures. FIGS. 9 and 10 illustrate families of methods 900, 1000 that may be performed or assisted by an enhanced system, such as system 102 or another functionality enhanced system as taught herein. FIG. 10 includes some refinements, supplements, or contextual actions for steps shown in FIG. 9, and incorporates the steps of FIG. 9 as options.

Technical processes shown in the Figures or otherwise disclosed will be performed automatically, e.g., by an enhanced system 102, unless otherwise indicated. Related processes may also be performed in part automatically and in part manually to the extent action by a human person is implicated, e.g., in some embodiments a human may move a mouse or press a keyboard key; such human activities may then be represented electronically by the computer as data 118. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIGS. 9 and 10. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 900 or 1000 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments provide or utilize a method for user interface control, the method performed by a computing system, the method including: displaying 902 in a user interface a layout diagram which visually and diagrammatically represents a current layout, the layout diagram including layout diagram regions which correspond to user interface component regions in the current layout, the user interface component regions having user interface components as occupants; getting 904 via the user interface a choice which identifies a traveler component and a destination region, the traveler component being an occupant of a source region; modifying 906 the current layout of the user interface to produce a modified layout in response to the choice; and updating 908 the layout diagram to match the modified layout.

In some embodiments, getting 904 the choice which identifies the traveler component and the destination region is performed without 1026 employing a drag-and-drop action 1028.

In some embodiments, modifying 906 the layout in response to the choice includes resizing 1036 the traveler component.

In some embodiments, the method further includes displaying 1038 the updated layout diagram via the user interface.

In some embodiments, the current layout 222 includes at least one region having at least two user interface components as occupants, each user interface component having a respective tab in the region and also having respective displayable contents which are displayed 1040 or hidden 1042 according to which tab is selected 1044, and modifying the current layout includes: creating 1004 a tab in the destination region in response to the choice; and moving 1018 the traveler component from the tab in the source region to the tab in the destination region.

In some embodiments, the current layout 222 includes at least one region having at least two user interface components as occupants, each user interface component having a respective tab in the region and also having respective displayable contents which are displayed 1040 or hidden 1042 according to which tab is selected 1044, and modifying the current layout includes: creating 1006 the destination region in response to the choice; and moving 1018 the traveler component from the tab in the source region to the destination region.

In some embodiments, the method includes splitting 1016 a region into at least two regions in response to the choice.

In some embodiments, the method includes creating 1006 a new region in a location on a periphery 1022 of the current user interface component regions in response to the choice.

In some embodiments, the layout diagram is displayed 902 as a menu item 304.

In some embodiments, the method includes visually highlighting 1024 the destination region or a destination region tab in response to the choice.

In some embodiments, the method includes visually highlighting 1024 the source region or a source region tab in response to the choice.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as windows 202, regions 204, components 220, tabs 218, layout diagrams 306, menus 302, icons 316, and stylized text representations 208, in the form of data 118 and instructions 116, read from a removable storage medium 114 and/or another source such as a network connection, to form a configured storage medium. The configured storage medium 112 is capable of causing a computer system 102 to perform technical process steps for user interface control, as disclosed herein. The Figures thus help illustrate configured storage media embodiments and process (a.k.a. method) embodiments, as well as system and process embodiments. In particular, any of the process steps illustrated in FIG. 9 or 10, or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform a method for user interface control. This method includes: displaying 902 in a user interface a layout diagram which visually and diagrammatically represents a current layout, the layout diagram including layout diagram regions which correspond to user interface component regions in the current layout, the user interface component regions having user interface components as occupants; getting 904 via the user interface a choice which identifies a traveler component and a destination region, the traveler component being an occupant of a source region, the getting characterized in at least one of the following ways: the getting is performed using 1002 an enhanced accessibility device instead of a keyboard or a mouse, the getting is performed without 1026 employing a drag-and-drop action, or the getting is performed 1030 in response to a voice command 1032; modifying 906 the current layout of the user interface to produce a modified layout in response to the choice; and updating 908 the layout diagram to match the modified layout.

Additional Observations

Additional support for the discussion of user interface control functionality herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Technical Character

The technical character of embodiments described herein will be apparent to one of ordinary skill in the art, and will also be apparent in several ways to a wide range of attentive readers. Some embodiments address technical activities such as creating, moving, or resizing regions in a graphical user interface window, which are each an activity deeply rooted in computing technology. Some of the technical mechanisms discussed include, e.g., tabs, enhanced accessibility devices, menus, and innovative user interface software. Some of the technical effects include, e.g., (a) visually, diagrammatically, and conveniently showing a user the predicted results of prospective window layout changes without actually performing any of those changes, thereby making user-computer interactions more efficient and effective, (b) avoiding requiring drag-and-drop operations for layout changes, thereby improving software accessibility, and (c) using line segments or icons in layout diagrams, thereby simplifying and clarifying the diagram content (relative to a zoomed miniature image) while also making accurate region identification easy for users. Thus, purely mental processes and activities limited to pen-and-paper are clearly excluded. Other advantages based on the technical characteristics of the teachings will also be apparent to one of skill from the description provided.

Different embodiments may provide different technical benefits or other advantages in different circumstances, but one of skill informed by the teachings herein will acknowledge that particular technical advantages will likely follow from particular innovation features or feature combinations.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to increase accessibility of software that includes a graphical user interface, e.g., by making operations such as drag-and-drop avoidable. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples, operating environments, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
ID: identification or identity
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. User interface control operations such as displaying 902 layout diagrams, getting 904 a choice via a user interface 132, modifying a layout 222, updating 908 a layout diagram data structure 306, and many other operations discussed herein, are understood to be inherently digital. A human mind cannot interface directly with a CPU or other processor, or with RAM or other digital storage, to read and write the necessary data to perform the user interface control steps taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/ or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as commanding, creating, displaying, getting, hiding, highlighting, matching, modifying, moving, representing, resizing, selecting, splitting, updating, utilizing (and commands, commanded, creates, created, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment, also referred to as computing environment; includes one or more systems 102
- 102 computer system, also referred to as a "computational system" or "computing system", and when in a network may be referred to as a "node"
- 104 users, e.g., user of an enhanced system 202; refers to a human or a human's online identity unless otherwise stated
- 106 peripheral device
- 108 network generally, including, e.g., LANs, WANs, software-defined networks, clouds, and other wired or wireless networks
- 110 processor; includes hardware
- 112 computer-readable storage medium, e.g., RAM, hard disks
- 114 removable configured computer-readable storage medium
- 116 instructions executable with processor; may be on removable storage media or in other memory (volatile or nonvolatile or both)
- 118 digital data in a system 102
- 120 kernel(s), e.g., operating system(s), BIOS, UEFI, device drivers
- 122 tools, e.g., cybersecurity tools, software development tools, office productivity tools, social media tools, diagnostics, browsers, games, email and other communication tools, commands, and so on
- 124 application program, e.g., a tool 122 which has a graphical user interface
- 126 display screens, also referred to as "displays"
- 128 computing hardware or software not otherwise associated with a reference number 106, 108, 110, 112, 114
- 130 application program content, e.g., program-generated content such as menus, output, GUI, and user-generated content such as text in a word processor or spreadsheet; digital
- 132 GUI; also referred to as graphical user interface or user interface
- 134 cloud, cloud computing environment
- 202 window in a GUI; digital (herein "digital" covers both any visual representation on screen and any underlying data structures or other code, or portion thereof); in some embodiments windows are nested, e.g., a window or a GUI control may be nested as a region within a larger window; in particular, although many examples herein discuss moving components within a single window, the teachings may also be beneficially applied recursively, e.g., to move windows 202 as components 220 within a larger context such as regions 204 of a desktop window 202 of a kernel 120 GUI
- 204 region in a window; refers to visual representation on screen and to underlying code and data structure; a given window may have its own constituent regions and also itself be a region in a larger surrounding window
- 206 region name, e.g., name of component in region; digital
- 208 line segments; digital
- 210 GUI controls, e.g., menus, buttons, dialog boxes, sliders, scroll bars, as well as animations, videos, and other content, and any graphical UI elements which offer control of such content; digital
- 212 window title bar; digital
- 214 window title; digital
- 216 tab name, e.g., name of component in tab; digital
- 218 tab; digital
- 220 user interface component, e.g., interface to an application or portion thereof and underlying application functionality; digital
- 222 layout, e.g., position, size, and occupants of regions and tabs; digital
- 302 menu; digital
- 304 menu item; digital
- 306 layout diagram; digital
- 308 layout diagram region; digital
- 310 division indicator; digital
- 312 prospective new region 308
- 314 source code; digital
- 316 icon; digital
- 318 portion of layout diagram region, e.g., as delimited by division indicator or highlighting; digital
- 702 cursor; digital
- 802 potential new region 308 representing potential new region 204, as opposed to a region 308 representing an existing region 204; digital
- 900 flowchart; 900 also refers to user interface control methods illustrated by or consistent with the FIG. 9 flowchart
- 902 computationally display a layout diagram, e.g., by suitable instructions to routines of a graphics library consistent with teachings provided herein
- 904 computationally get a layout change choice, e.g., by suitable instructions to routines of a graphics library or peripheral I/O library consistent with teachings provided herein
- 906 computationally modify a layout, e.g., by suitable instructions to routines of a graphics library consistent with teachings provided herein
- 908 computationally update a layout diagram, e.g., by suitable instructions to modify a layout diagram data structure consistent with teachings provided herein; note that display 1038 of the updated layout diagram is a separate step from the updating 908
- 910 computationally update displayable content 130, e.g., by suitable instructions to routines of a graphics library consistent with teachings provided herein, or by triggering an application 124 to have the application update the content; may also include displaying an updated window 202 showing a modified layout

912 loop in execution of method 900

1000 flowchart; 1000 also refers to user interface control methods illustrated by or consistent with the FIG. 10 flowchart (which incorporates the steps of FIG. 9)

1002 computationally use an enhanced accessibility device, e.g., for I/O with a GUI 132, to get 904 choices or other input, allow a user to guide selection 1044 of an item, or provide feedback on GUI status (e.g., via screen reader)

1004 computationally create a tab, e.g., by suitable instructions to routines of a graphics library consistent with teachings provided herein

1006 computationally create a region, e.g., by suitable instructions to routines of a graphics library consistent with teachings provided herein

1008 computationally represent an item in a GUI using a text stylization, e.g., by suitable instructions to routines of a graphics library consistent with teachings provided herein

1010 computationally represent an item in a GUI using an icon, e.g., by suitable instructions to routines of a graphics library consistent with teachings provided herein

1012 computationally match layout diagram relative sizes to region 204 relative sizes, e.g., by suitable instructions to routines of a graphics library when displaying layout diagrams, consistent with teachings provided herein

1014 computationally represent, in a GUI layout diagram, splitting a region 204, e.g., by suitable instructions to routines of a graphics library to draw a division indicator, consistent with teachings provided herein

1016 computationally split a region 204, e.g., by suitable instructions to routines of a graphics library consistent with teachings provided herein

1018 computationally move a traveler component 220, e.g., by suitable instructions to routines of a graphics library consistent with teachings provided herein

1020 computationally represent in a GUI an option of creating a region 204 in a periphery, e.g., by suitable instructions to routines of a graphics library consistent with teachings provided herein

1022 periphery of existing regions 204

1024 computationally visually highlight an item in a GUI, e.g., by suitable instructions to routines of a graphics library consistent with teachings provided herein

1026 computationally avoid using (i.e., relying on) a drag-and-drop operation

1028 computational drag-and-drop operation; typically performed using a mouse

1030 computationally get a choice using a voice command capability of a user interface

1032 voice command as representing digitally

1034 computationally display a layout diagram as a menu item, e.g., by suitable instructions to routines of a graphics library consistent with teachings provided herein

1036 computationally resize an item in a GUI, e.g., by suitable instructions to routines of a graphics library consistent with teachings provided herein

1038 computationally display an updated layout diagram, e.g., by suitable instructions to routines of a graphics library consistent with teachings provided herein

1040 computationally display (make visible) component content 130, e.g., by suitable instructions to routines of a graphics library consistent with teachings provided herein

1042 computationally hide (make not visible) component content 130, e.g., by suitable instructions to routines of a graphics library consistent with teachings provided herein

1044 computationally select a GUI item, e.g., by suitable instructions to routines of a graphics library consistent with teachings provided herein

1046 any step discussed in the present disclosure that has not been assigned some other reference numeral

1100 enhanced accessibility device

1102 accessibility switch device, e.g., assistive substitute for keyboard or mouse

1104 screen reader

1106 haptic feedback device

1108 tactile representation device, e.g., for text-to-braille translation

CONCLUSION

In short, the teachings herein provide a variety of user interface layout control functionalities which operate in enhanced systems 102. An embodiment facilitates user control of user interface layouts 222. A layout diagram 306 visually and diagrammatically represents a current layout 222. Other layout diagrams 306 visually and diagrammatically represent possible modified layouts 222. The layout diagram 306 includes layout diagram regions 308 which correspond to user interface component regions 204 in the actual current layout. The user interface component regions 204 have user interface components 220 as occupants, e.g., application programs 124, 220 or application program windows 202, 220. The embodiment gets 904 a choice identifying a traveler component and a destination region, with the traveler component being an occupant of a source region. The embodiment modifies 906 the current layout of the user interface to produce a modified layout 222 in response to the choice, and updates 908 the layout diagram to match the modified layout. Some embodiments get 904 the layout modification choice using an enhanced accessibility device 1100 such as a switch 1102 instead of a keyboard or a mouse. Some get 904 the choice while avoiding 1026 a drag-and-drop action, and some use 1030 a voice command 1032. User interaction with the system 102 is improved by diagrammatically showing 902 the user results of possible layout changes before performing 906 any of them.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIG. 9 or 10 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system which is configured to control a user interface, comprising:
    a digital memory;
    a display device configured with the user interface; and
    a processor in operable communication with the digital memory, the processor configured to perform user interface control steps including displaying in the user interface a layout diagram which visually and diagrammatically represents a layout, the layout diagram including layout diagram regions which correspond to user interface component regions in a current layout, the user interface component regions having user interface components as occupants, getting a choice which identifies a particular user interface component in a particular user interface component region, and modifying the current layout to produce a modified layout in response to the choice; and
    wherein the system is further configured in at least one of the following ways:
        the layout diagram regions have respective layout diagram region sizes, the user interface component regions have respective user interface component region sizes, and the layout diagram relative sizes match the user interface component region relative sizes within a 25% tolerance,
        the layout diagram visually and diagrammatically represents a modified layout option in which the modifying splits one of the user interface component regions per a division indicator to thereby form at least two user interface component regions, the division indicator displayed in the layout diagram,
        the layout diagram visually and diagrammatically represents a modified layout option in which the modifying creates a new user interface component region that is located in a periphery location outside a smallest combined current regions display area which includes all respective display areas of all the current layout user interface component regions, or
        the layout diagram visually indicates the choice of the particular user interface component region among at least two component regions.

2. The computing system of claim 1, further comprising an enhanced accessibility device, wherein the getting is performed using at least the enhanced accessibility device, and wherein the enhanced accessibility device comprises at least one of the following:
    an accessibility switch device;
    a screen reader which vocalizes layout information;
    a haptic feedback device; or
    a tactile representation device which provides a tactile representation of layout information.

3. The computing system of claim 1, wherein the current layout includes at least one region having at least two user interface components as occupants, each user interface component having a respective tab in the region and also having respective displayable contents, and wherein the system is configured to display or hide the displayable content according to which tab is selected, and wherein modifying the current layout comprises at least one of the following:
    moving the particular user interface component from a tab in the particular user interface component region to a tab in a destination region, the tab in the destination region created in response to the choice; or
    moving the particular user interface component from a tab in the particular user interface component region to the destination region after creating the destination region in response to the choice.

4. The computing system of claim 1, wherein the layout diagram represents a displayable content of a user interface component using at least one of the following:
    a set of line segments as a stylized representation of text content; or
    an icon as a stylized representation of a particular category of content.

5. The computing system of claim 1, wherein the layout diagram regions have respective layout diagram region sizes, the user interface component regions have respective user interface component region sizes, and a ratio of sizes of any two layout diagram regions LR1 and LR2 is within an inclusive range from 0.9 times AR to 1.1 times AR, where AR is a ratio of actual region sizes of AR1 and AR2, where AR1 and AR2 are user interface component regions represented in the layout diagram by LR1 and LR2.

6. The computing system of claim 1, wherein the layout diagram visually and diagrammatically represents an option of splitting a region into at least two regions.

7. The computing system of claim 1, wherein the layout diagram visually and diagrammatically represents an option of creating a new region in a location on a periphery of the current layout diagram regions.

8. A method for user interface control, the method performed by a computing system, the method comprising:
    displaying in a user interface a layout diagram for modifying a current layout, the layout diagram visually and diagrammatically representing the current layout, the layout diagram including layout diagram regions which correspond to user interface component regions in the current layout, the user interface component regions having user interface components as occupants, the layout diagram displaying an additional user interface component region in a periphery location outside the current layout user interface component regions;
    getting via the user interface a choice which identifies a particular user interface component in the current layout and identifies the additional user interface component region in the periphery location as a destination region, the particular user interface component being an occupant of a particular user interface component region;
    modifying, in response to the choice, the current layout of the user interface to produce a modified layout by moving the particular user interface component to the destination region; and
    updating the user interface to show a different layout diagram to match the modified layout.

9. The method of claim 8, wherein getting the choice which identifies the particular user interface component and the destination region is performed without employing a drag-and-drop action.

10. The method of claim 8, wherein modifying the layout in response to the choice comprises resizing the particular user interface component.

11. The method of claim 8, further comprising displaying the updated layout diagram via the user interface.

12. The method of claim 8, wherein the current layout includes at least one region having at least two user interface components as occupants, each user interface component having a respective tab in the region and also having respective displayable contents which are displayed or hidden according to which tab is selected, and wherein modifying the current layout comprises:
- creating a tab in the destination region in response to the choice; and
- moving the particular user interface component from the tab in the particular user interface component region to the tab in the destination region.

13. The method of claim 8, wherein the current layout includes at least one region having at least two user interface components as occupants, each user interface component having a respective tab in the region and also having respective displayable contents which are displayed or hidden according to which tab is selected, and wherein modifying the current layout comprises:
- creating the destination region in response to the choice; and
- moving the particular user interface component from the tab in the particular user interface component region to the destination region.

14. The method of claim 8, further comprising splitting a region into at least two regions in response to the choice.

15. The method of claim 8, further comprising creating a new region in a location on a periphery of the current user interface component regions in response to the choice.

16. The method of claim 8, wherein the layout diagram is displayed as a menu item.

17. The method of claim 8, further comprising visually highlighting the destination region or a destination region tab in response to the choice.

18. The method of claim 8, further comprising visually highlighting the particular user interface component region or a tab of the particular user interface component region in response to the choice.

19. A computer-readable storage device configured with data and instructions which upon execution by a processor cause a computing system to perform a method for user interface control, the method comprising:
- displaying in a user interface a layout diagram which visually and diagrammatically represents a current layout, the layout diagram including layout diagram regions which correspond to user interface component regions in the current layout, the user interface component regions having user interface components as occupants, wherein the layout diagram regions have respective layout diagram region sizes, the user interface component regions have respective user interface component region sizes, and the layout diagram relative sizes match the user interface component region relative sizes within a 20% tolerance;
- getting via the user interface a choice which identifies a particular user interface component and a destination region, the particular user interface component being an occupant of a particular user interface component region, the getting characterized in at least one of the following ways: the getting is performed using an enhanced accessibility device instead of a keyboard or a mouse, the getting is performed without employing a drag-and-drop action, or the getting is performed in response to a voice command;
- modifying the current layout of the user interface to produce a modified layout in response to the choice; and
- updating a user interface menu to show a different layout diagram to match the modified layout.

20. The computer-readable storage device of claim 19, wherein the getting is performed in response to a voice command from a user.

* * * * *